United States Patent
Li

(10) Patent No.: US 8,215,595 B2
(45) Date of Patent: Jul. 10, 2012

(54) CABLE COLLECTING APPARATUS

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 240 days.

(21) Appl. No.: 12/479,963

(22) Filed: Jun. 8, 2009

(65) Prior Publication Data

US 2010/0270439 A1    Oct. 28, 2010

(30) Foreign Application Priority Data

Apr. 23, 2009   (CN) ............... 2009 2 0302519 U

(51) Int. Cl.
*F16L 3/08* (2006.01)

(52) U.S. Cl. ............ 248/74.2; 248/314; 248/65

(58) Field of Classification Search ............ 248/689, 248/690, 56, 65, 68.1, 74.2, 74.4, 71, 316.1, 248/316.2, 316.6, 316.7
See application file for complete search history.

(56) References Cited

U.S. PATENT DOCUMENTS

| | | | | |
|---|---|---|---|---|
| 4,325,526 A * | 4/1982 | Kitagawa | | 248/73 |
| 4,356,599 A * | 11/1982 | Larson et al. | | 24/16 PB |
| 4,669,688 A * | 6/1987 | Itoh et al. | | 248/74.2 |
| 6,164,603 A * | 12/2000 | Kawai | | 248/73 |
| 6,494,412 B2 * | 12/2002 | Gombert | | 248/65 |
| 6,654,240 B1 * | 11/2003 | Tseng et al. | | 361/679.33 |
| 6,923,407 B2 * | 8/2005 | Takeuchi | | 248/73 |
| 7,037,025 B2 * | 5/2006 | Takahashi et al. | | 403/282 |
| 7,304,861 B2 * | 12/2007 | Takahashi | | 361/760 |
| 7,724,506 B2 * | 5/2010 | Wu et al. | | 361/679.01 |
| 2003/0213876 A1 * | 11/2003 | Takeuchi | | 248/71 |
| 2008/0045076 A1 * | 2/2008 | Dittmann et al. | | 439/495 |
| 2009/0231817 A1 * | 9/2009 | Xue | | 361/759 |

* cited by examiner

Primary Examiner — Nkeisha Smith
(74) Attorney, Agent, or Firm — Altis Law Group, Inc.

(57) ABSTRACT

A cable collecting apparatus includes a base plate and a cover plate. The cover plate extends at diagonal relative to the base plate in a first state. A receiving room is enclosed by the base plate and the cover plate in a second state. A first end of the cover plate is rotatably and resiliently connected to the base plate at a joint. A second end of the cover plate is capable of engaging with the base plate.

8 Claims, 5 Drawing Sheets

CABLE COLLECTING APPARATUS

BACKGROUND

1. Technical Field

The present disclosure relates to a cable collecting apparatus and, particularly, to a cable collecting apparatus in an electronic device.

2. Description of Related Art

Nowadays, there are more and more cables associated with electronic devices. If the cables are not managed, they will become disordered. Conventionally, the cables are managed via a binding accessory. This will add to cost and sometimes influence other components in the electronic device.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
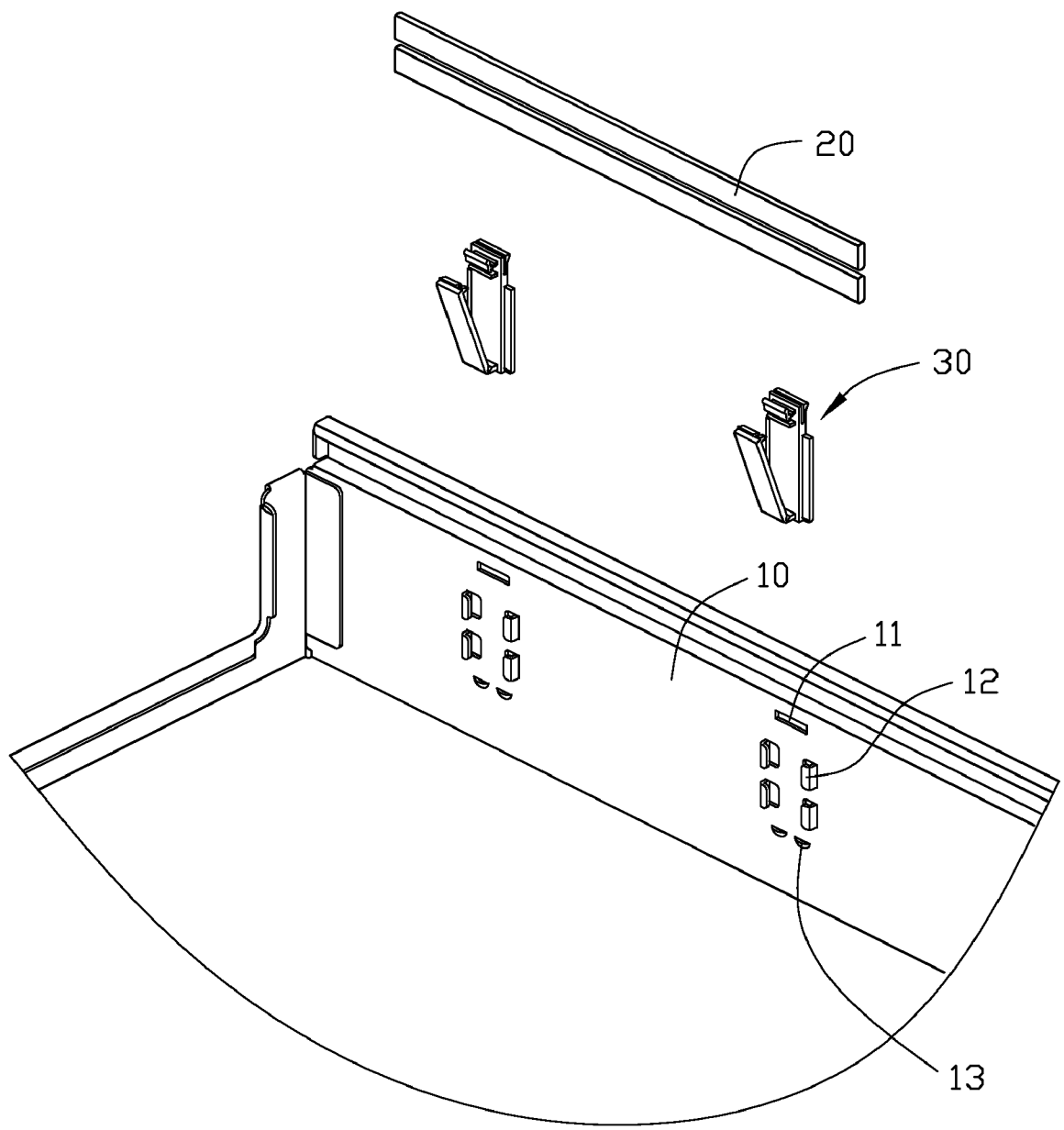
FIG. 1 is an exploded, isometric view of a cable collecting apparatus in an electronic device.

Referring to FIG. 1, a cable collecting apparatus 30 is configured for collecting cables 20 in an electronic device. An enclosure 10 is part of an electronic device.

An opening 11 is defined in the enclosure 10. The enclosure 10 has a plurality of positioning pieces 12. Two projections 13 are protruded from the enclosure 10. The positioning pieces 12 are situated between the opening 11 and the projections 13.

Figure 2:
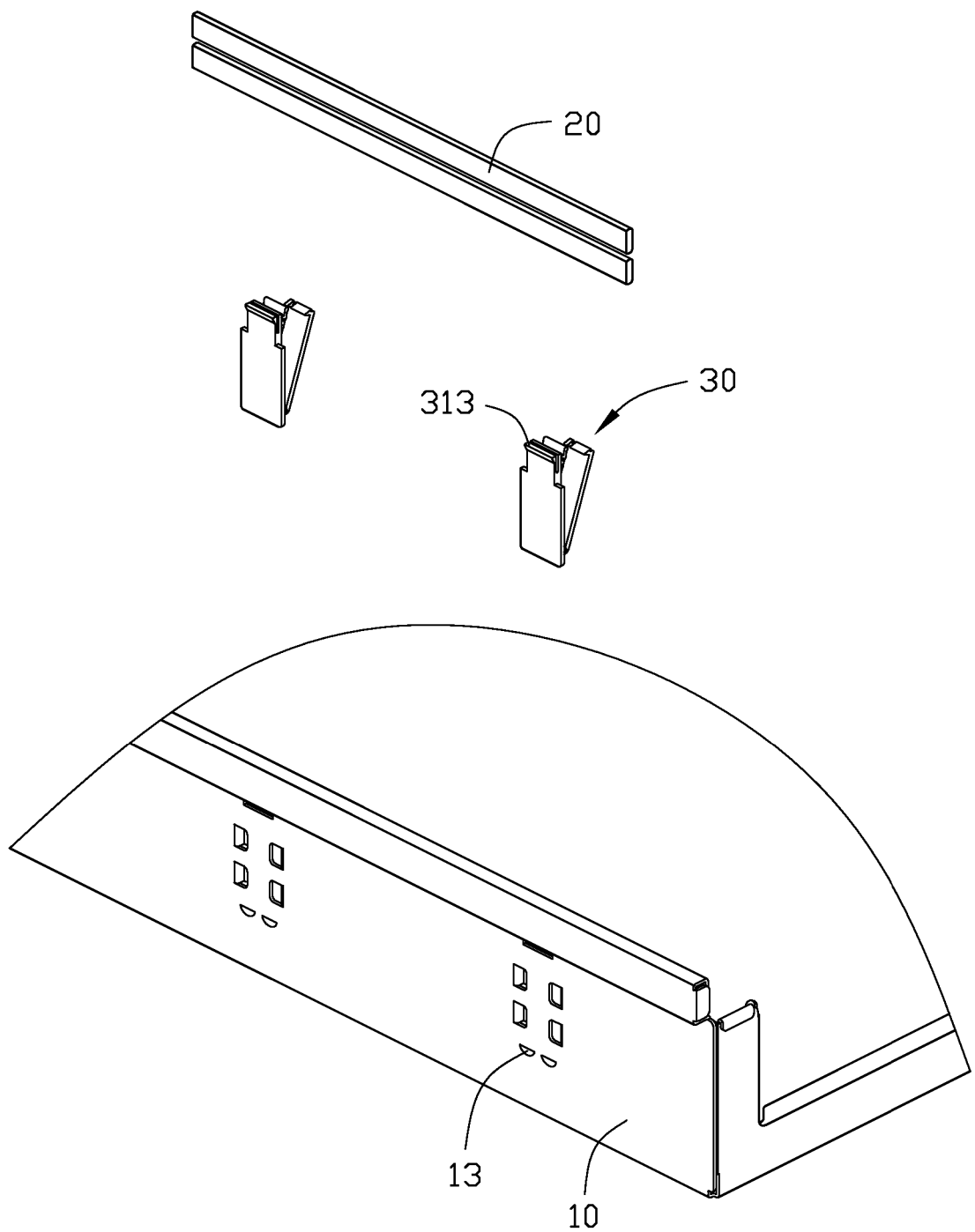
FIG. 2 is another exploded, isometric view of the cable collecting apparatus in the electronic device.
Figure 3:
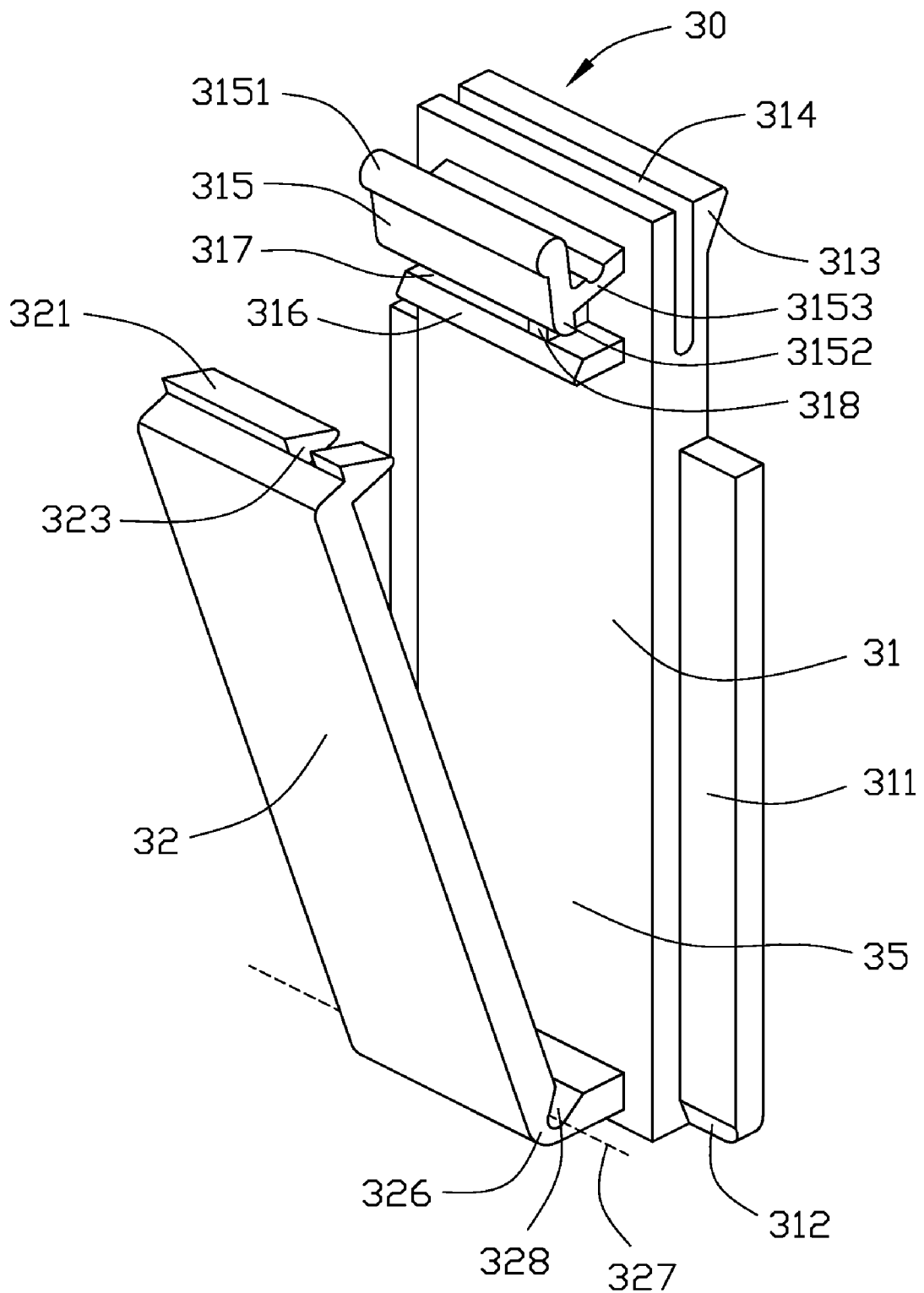
FIG. 3 is an assembled view of the cable collecting apparatus of FIG. 1.

Referring to FIG. 2 and FIG. 3, the cable collecting apparatus 30 includes a base plate 31 and a cover plate 32 connecting to the base plate 31. Two sliding blocks 311 are formed on two sides of the base plate 31. A stopper portion 312 is projected from an end of each sliding block 311. A thickness of the sliding block 311 can be smaller than a thickness of the base plate 31. A thickness of the stopper portion 312 can be smaller than a thickness of the sliding block 311.

An elastic hook 313 is formed from a top portion of the base plate 31. A space 314 is defined between the hook 313 and a top portion of the base plate 31. An operating member 315 is located on the top portion of the base plate 31. The operating member 315 includes a pressing portion 3151, a resisting portion 3152 opposite to the pressing portion 3151, and a post 3153 located between the pressing portion 3151 and the resisting portion 3152. A board 316 is formed on the base plate 31. A groove 317 is defined between the board 316 and the operating member 315. A positioning block 318 is placed in the groove 317.

A first end of the cover plate 32 is rotatably connected with the base plate 31. A connecting portion 326 is formed on the first end. A pivot axis 327 is defined by the first end. A recess 328 is defined in the first end adjacent to the pivot axis 327. A second end of the cover plate 32 is bent towards the base plate 31 to form a wedge-shaped engaging portion 321. A cutout 323 is defined in the engaging portion 321. A receiving room 35 is defined between the cover plate 32 and the base plate 31.

Figure 4:
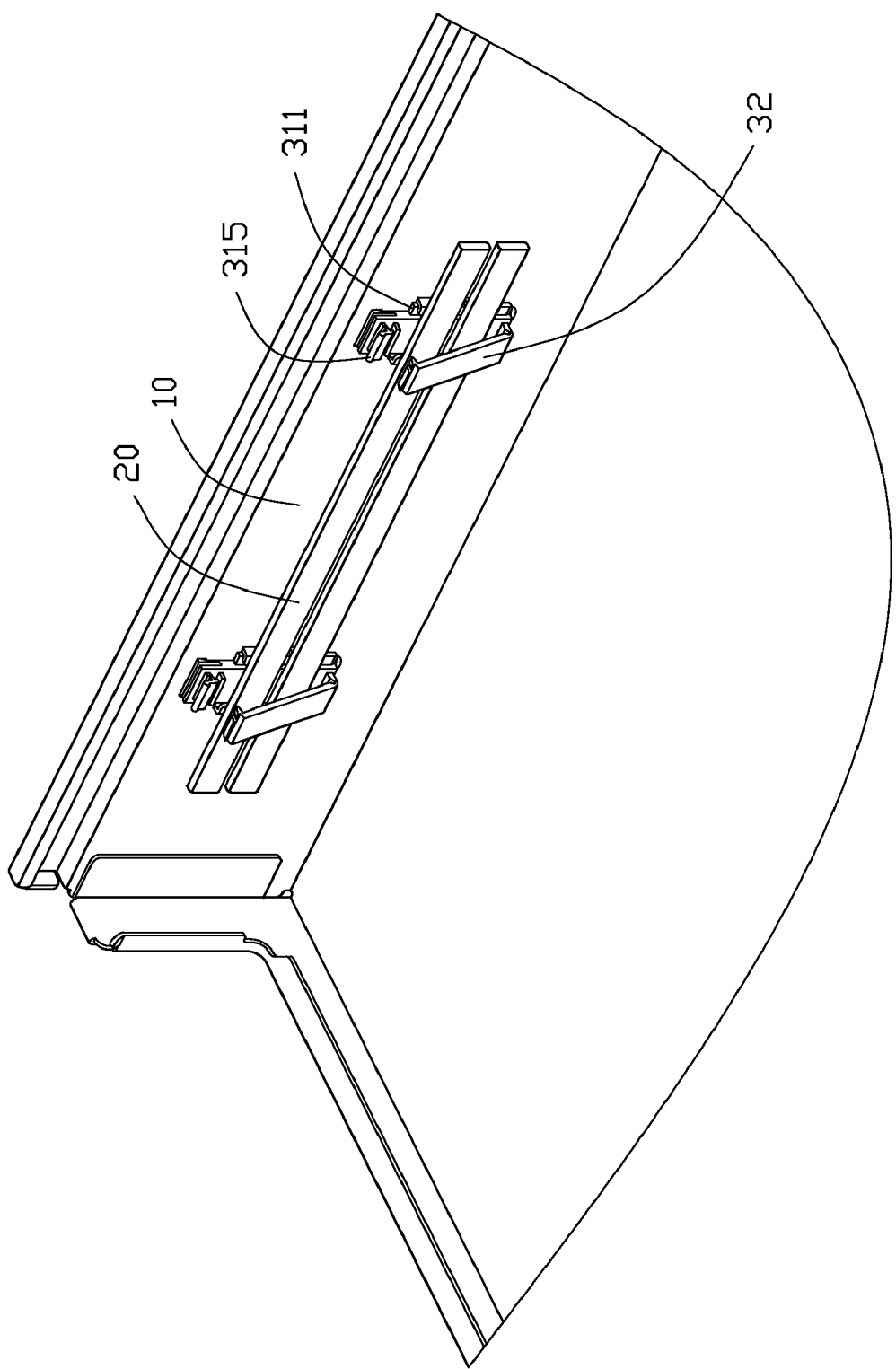
FIG. 4 is an assembled view of the cable collecting apparatus in the electronic device of FIG. 1.
Figure 5:
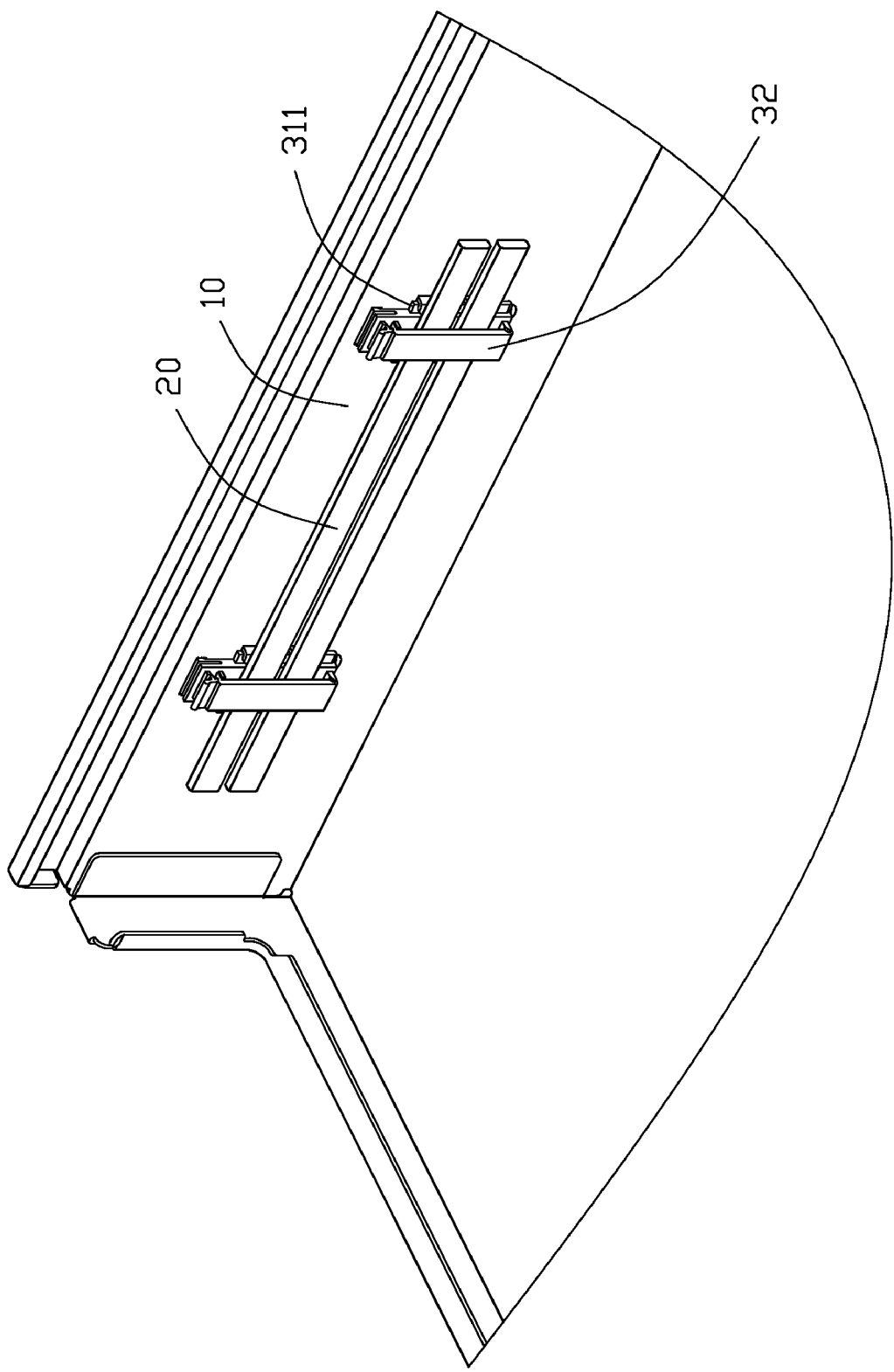
FIG. 5 is an assembled view of FIG. 4.

Referring to FIG. 4 and FIG. 5, the cable collecting apparatus 30 is mounted on the enclosure 10. The sliding blocks 311 of the base plate 31 are slid into the positioning pieces 12 of the enclosure 10. The stopper portions 312 of the sliding blocks 311 are stopped by the projections 13. The hook 313 of the base plate 31 is inserted into the opening 11 of the enclosure 10. Thereby, the base plate 31 is fixed on the enclosure 10.

The cables 20 are disposed in the receiving room 35. The cover plate 32 is pressed towards the base plate 31. The cover plate 32 is rotated about the pivot axis 327. The engaging portion 321 of the cover plate 32 is inserted into the groove 317 of the base plate 31. The positioning block 318 of the base plate 31 extends through the cutout 323 of the cover plate 32. The engaging portion 321 engages with the resisting portion 3152 of the operating member 315. Thereby, the cables 20 are clasped in the electronic device.

To release the cables 20 from the electronic device, the pressing portion 3151 of the operating member 315 is pressed. The resisting portion 3152 is moved by the operating member 315. The engaging portion 321 disengages from the resisting portion 3152. The cover plate 32 is moved away from the base plate 31. Thereby, the cables 20 are released from the cable collecting apparatus 30.

To remove the cable collecting apparatus 30 from the enclosure 10, the hook 313 of the base plate 31 is detached from the opening 11 of the enclosure 10. The sliding blocks 311 of the base plate 31 are slid out from the positioning pieces 12. The stopper portion 312 is moved away from the projections 13. The cable collecting apparatus 30 is taken out from the enclosure 10.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable collecting apparatus comprising:

a base plate; and a cover plate extending at diagonal relative to the base plate in a first state, a receiving room enclosed by the base plate and the cover plate in a second state;

a first end of the cover plate rotatably and resiliently connecting with the base plate at a joint, a second end of the cover plate capable of engaging with the base plate;

wherein a recess is defined at an inner corner of the joint of the cover plate and the base plate, and the base plate further comprises a straight hook adjacent to a space defined at a distal end of the base plate, a wedge-shaped engaging portion is formed on the cover plate, and a resisting portion is formed in the base plate to engage with the engaging portion;

a cutout is defined in the engaging portion, and a positioning block is formed on the base plate corresponding to the cutout.

2. The cable collecting apparatus of claim 1, wherein an operating member is integrally formed with the resisting portion to resiliently engage with the engaging portion.

3. A cable collecting apparatus located in an enclosure, comprising:
- a base plate;
- a cover plate extending at diagonal relative to the base plate in a first state, a receiving room enclosed by the base plate and the cover plate in a second state;
- a first end of the cover plate rotatably and resiliently connecting with the base plate at a joint, a second end of the cover plate capable of engaging with the base plate;
- wherein a recess is defined at an inner corner of the joint of the cover plate and the base plate; and two sliding blocks are respectively located on two sides of the base plate, and a plurality of positioning pieces extends from the enclosure to position the sliding blocks;
- a wedge-shaped engaging portion is formed on the cover plate to engage with the base plate; and
- a stopper portion extends from each sliding block, a projection is protruding from the enclosure to resist the stopper portion.

4. The cable collecting apparatus of claim 3, wherein a cutout is defined in the engaging portion, a positioning block is formed on the base plate corresponding to the cutout.

5. The cable collecting apparatus of claim 3, wherein a hook extends from a top portion of the base plate, an opening is defined in the enclosure to receive the hook.

6. The cable collecting apparatus of claim 5, wherein a space is defined between the base plate and the hook.

7. A cable collecting apparatus comprising:
- a base plate; and
- a cover plate extending diagonally relative to the base plate in a first state, a receiving room enclosed by the base plate and the cover plate in a second state;
- a first end of the cover plate rotatably and resiliently connecting with the base plate at a joint, a second end of the cover plate capable of engaging with the base plate;
- wherein a recess is defined at an inner corner of the joint of the cover plate and the base plate, and the base plate further comprises a straight hook adjacent to a space defined at a distal end of the base plate; and
- two sliding blocks respectively extend from two lateral sides of the base plate, extending directions of the two sliding blocks are substantially parallel to a plane of the base plate, and a thickness of each sliding block is less than a thickness of the base plate;
- wherein the base plate and the two sliding blocks are substantially located on a same plane.

8. The cable collecting apparatus of claim 7, wherein a stopper portion extends from each sliding block, and a thickness of the stopper portion is less than a thickness of the sliding block.

* * * * *